United States Patent
Fontana et al.

(10) Patent No.: US 9,475,399 B2
(45) Date of Patent: Oct. 25, 2016

(54) POWER CONDUIT, CHARGING DEVICE, AND METHOD OF CHARGING A POWER STORAGE DEVICE

(71) Applicant: General Electric Company, Schenectady, NY (US)

(72) Inventors: Edward Clark Fontana, Rockwall, TX (US); Robert John Minor, Dallas, TX (US)

(73) Assignee: General Electric Company, Schenectady, NY (US)

( * ) Notice: Subject to any disclaimer, the term of this patent is extended or adjusted under 35 U.S.C. 154(b) by 404 days.

(21) Appl. No.: 13/771,835

(22) Filed: Feb. 20, 2013

(65) Prior Publication Data

US 2014/0232338 A1 Aug. 21, 2014

(51) Int. Cl.
*H02J 7/00* (2006.01)
*B60L 11/18* (2006.01)
(Continued)

(52) U.S. Cl.
CPC ............ *B60L 11/1824* (2013.01); *B60L 3/003* (2013.01); *B60L 7/12* (2013.01); *B60L 11/1818* (2013.01); *B60L 11/1846* (2013.01); *B60L 11/1861* (2013.01); *B60L 11/1887* (2013.01); *B60L 2230/16* (2013.01); *B60L 2240/529* (2013.01); *B60L 2240/70* (2013.01); *B60L 2250/20* (2013.01); *B60L 2270/32* (2013.01); *B60L 2270/34* (2013.01); *Y02T 10/7005* (2013.01); *Y02T 10/705* (2013.01); *Y02T 10/7044* (2013.01); *Y02T 10/7088* (2013.01); *Y02T 10/7291* (2013.01); *Y02T 30/14* (2013.01); *Y02T 90/121* (2013.01); *Y02T 90/128* (2013.01); *Y02T 90/14* (2013.01); *Y02T 90/16* (2013.01);
(Continued)

(58) Field of Classification Search
CPC ....................................................... H02J 7/00
USPC ....................................................... 320/109
See application file for complete search history.

(56) References Cited

U.S. PATENT DOCUMENTS

| 8,025,526 B1 | 9/2011 | Tormey et al. |
| 8,075,329 B1 | 12/2011 | Janarthanam et al. |
| 2010/0207588 A1* | 8/2010 | Lowenthal et al. .......... 320/165 |

(Continued)

OTHER PUBLICATIONS

ChargePoint Networked Charging Stations, Copyright 2010, Coulomb Technologies, Inc., pp. 1-4, Campbell, CA, USA; available at http://www.coulombtech.com/files/CT2100-Data-Sheet.pdf, last visited Jul. 9, 2012.

(Continued)

*Primary Examiner* — Mohammed Alam
(74) *Attorney, Agent, or Firm* — General Electric Company (57) ABSTRACT

A power conduit for charging a power storage device of a vehicle includes an output terminal and locking mechanism operatively disposable in one of an engaged and a disengaged position. The locking mechanism locks the output terminal to the vehicle when the locking mechanism is in the engaged position and unlocks the output terminal when in the disengaged position. The power conduit includes a controller including a memory device configured to store a plurality of computer-executable instructions and a processor coupled to the memory device. The instructions configure the processor to receive an identifier associated with one of the vehicle and a user of the vehicle, and generate and transmit an unlocking signal to cause the locking mechanism to be in the disengaged position upon one of a determination that the identifier was received and a determination that a predetermined charge state of the power storage device has been reached.

20 Claims, 5 Drawing Sheets

(51) Int. Cl.
  *B60L 3/00*   (2006.01)
  *B60L 7/12*   (2006.01)

(52) U.S. Cl.
  CPC ............. *Y02T90/163* (2013.01); *Y02T 90/169* (2013.01); *Y02T 90/34* (2013.01)

(56) References Cited

U.S. PATENT DOCUMENTS

| | | |
|---|---|---|
| 2011/0140656 A1 | 6/2011 | Starr et al. |
| 2011/0181240 A1 | 7/2011 | Baarman et al. |
| 2011/0279083 A1* | 11/2011 | Asai et al. .................... 320/109 |
| 2012/0071017 A1* | 3/2012 | Gaul et al. .................... 439/304 |
| 2012/0088382 A1* | 4/2012 | Konchan ...................... 439/153 |
| 2014/0002018 A1* | 1/2014 | Montemayor Cavazos et al. ............................ 320/109 |

OTHER PUBLICATIONS

Electric Vehicle Charging Solutions, GE Energy Industrial Solutions, pp. 1-8, Ref. E/5379/E/Ex. 5.0 Ed., Feb. 2011.
Siemens Community Multi-Level Electric Vehicle Charging Solutions, pp. 1-2, Published by and Copyright 2010, Siemens AG, Siemens Energy, Inc. Wendell, North Carolina, USA.

* cited by examiner

POWER CONDUIT, CHARGING DEVICE, AND METHOD OF CHARGING A POWER STORAGE DEVICE

BACKGROUND

The present application relates generally to charging devices and, more particularly, to a power conduit, a charging device, and a method of charging a power storage device.

As electric vehicles and/or hybrid electric vehicles have gained popularity, an associated need to manage delivery of electrical energy to such vehicles has increased. Moreover, a need to provide safe and efficient charging devices or stations has been created by the increased use of such vehicles.

At least some known electric vehicles include an internal battery that is charged using a charging station. Such charging stations typically include a power cable or another conductor that may be removably coupled to the electric vehicle. The charging stations receive electricity from an electric utility distribution network or another electricity source, and deliver electricity to the electric vehicle battery through the power cable.

Some known charging stations are positioned in public or publicly accessible locations, such as parking garages or parking lots, to provide paid charging services to customers who park electric vehicles within the locations. Depending on a state of charge of an electric vehicle battery and a capacity of an associated charging station, it may take several hours or more to charge the battery. Users of the charging stations may not want to wait at the vehicle location while the vehicle battery is being charged. However, if the user leaves the location of the vehicle while the battery is being charged, one or more bystanders and/or passersby may disconnect the power cable from the electric vehicle, thus preventing the battery from being charged to a desired level.

BRIEF DESCRIPTION

In one embodiment, a power conduit for charging a power storage device of a vehicle is provided that includes an output terminal and a locking mechanism operatively disposable in one of an engaged position and a disengaged position, wherein the locking mechanism is configured to lock the output terminal to the vehicle when the locking mechanism is in the engaged position and configured to unlock the output terminal from the vehicle when the locking mechanism is in the disengaged position. The power conduit also includes a controller operatively coupled to the locking mechanism. The controller includes a memory device configured to store a plurality of computer-executable instructions, and a processor coupled to the memory device, wherein, when executed by the processor, the computer-executable instructions configure the processor to receive an identifier associated with one of the vehicle and a user of the vehicle, and to generate and transmit an unlocking signal to cause the locking mechanism to be in the disengaged position upon one of a determination that the identifier was received and a determination that a predetermined charge state of the power storage device has been reached.

In another embodiment, a charging device is provided for use in charging a power storage device of a vehicle through a power conduit that includes an output terminal and a locking mechanism operatively disposable in one of an engaged position and a disengaged position, the locking mechanism configured to lock the output terminal of the power conduit to the vehicle when the locking mechanism is in the engaged position and configured to unlock the output terminal from the vehicle when the locking mechanism is in the disengaged position. The charging device includes a memory device configured to store a plurality of computer-executable instructions, and a processor coupled to the memory device. When executed by the processor, the computer-executable instructions configure the processor to receive an identifier associated with one of the vehicle and a user of the vehicle, and transmit an unlocking signal to the power conduit to cause the locking mechanism to be in the disengaged position upon one of a determination that the identifier was received and a determination that a predetermined charge state of the power storage device has been reached.

In yet another embodiment, a method is provided for charging a power storage device of a vehicle using a charging device and a power conduit configured to be coupled to the charging device and the vehicle, wherein the power conduit includes an output terminal and a locking mechanism. The method includes engaging the locking mechanism to lock the output terminal of the power conduit to the vehicle, initiating a charging operation to charge the power storage device using the charging device, receiving, by a processor, an identifier associated with one of the vehicle and a user of the vehicle, and disengaging, by the processor, the locking mechanism to unlock the output terminal from the vehicle upon a determination that the identifier was received or upon a determination that a predetermined charge state of the power storage device has been reached.

DETAILED DESCRIPTION

As described herein, a robust and effective charging device and power conduit are provided for a vehicle, such as an electric vehicle. In an exemplary embodiment, the charging device includes a controller, a communication device, and a user interface. The power conduit includes a controller and a locking mechanism. In one embodiment, the power conduit also includes a communication device and a user interface.

In an exemplary embodiment, a user plugs the power conduit into the electric vehicle and enters an identifier into the charging device controller using the communication device or the user interface of the charging device. The charging device controller transmits a locking signal to the power conduit controller to cause the power conduit controller to engage the locking mechanism, thus locking the power conduit to the electric vehicle. A charging operation is then initiated to supply power to the electric vehicle. The power conduit remains locked to the electric vehicle until the user enters the identifier into the charging device controller a second time. When the charging device controller determines that the identifier has been received a second time, the charging device controller transmits an unlocking signal to the power conduit controller to cause the power conduit controller to disengage the locking mechanism, thus unlocking the power conduit from the electric vehicle.

In another embodiment, the user plugs the power conduit into the electric vehicle and enters the identifier into the power conduit controller using the communication device or the user interface of the power conduit. The power conduit controller engages the locking mechanism to lock the power conduit to the electric vehicle. A charging operation is then initiated to supply power to the electric vehicle. The power conduit remains locked to the electric vehicle until the user enters the identifier into the power conduit controller a second time. When the power conduit controller determines that the identifier has been received a second time, the power conduit controller disengages the locking mechanism to unlock the power conduit from the electric vehicle.

In some embodiments, the term "electric vehicle" refers generally to a vehicle that includes one or more electric motors. Energy used by electric vehicles may come from various sources, such as, but not limited to, an on-board rechargeable battery and/or an on-board fuel cell. In one embodiment, the electric vehicle is a hybrid electric vehicle, which captures and stores energy generated, for example, by braking. Moreover, a hybrid electric vehicle uses energy stored in an electrical source, such as a battery, to continue operating when idling to conserve fuel. Some hybrid electric vehicles are capable of recharging the battery by plugging into a power receptacle, such as a power outlet. Accordingly, the term "electric vehicle" as used herein may refer to a hybrid electric vehicle or any other vehicle to which electrical energy may be delivered, for example, via the power grid.

Figure 1:
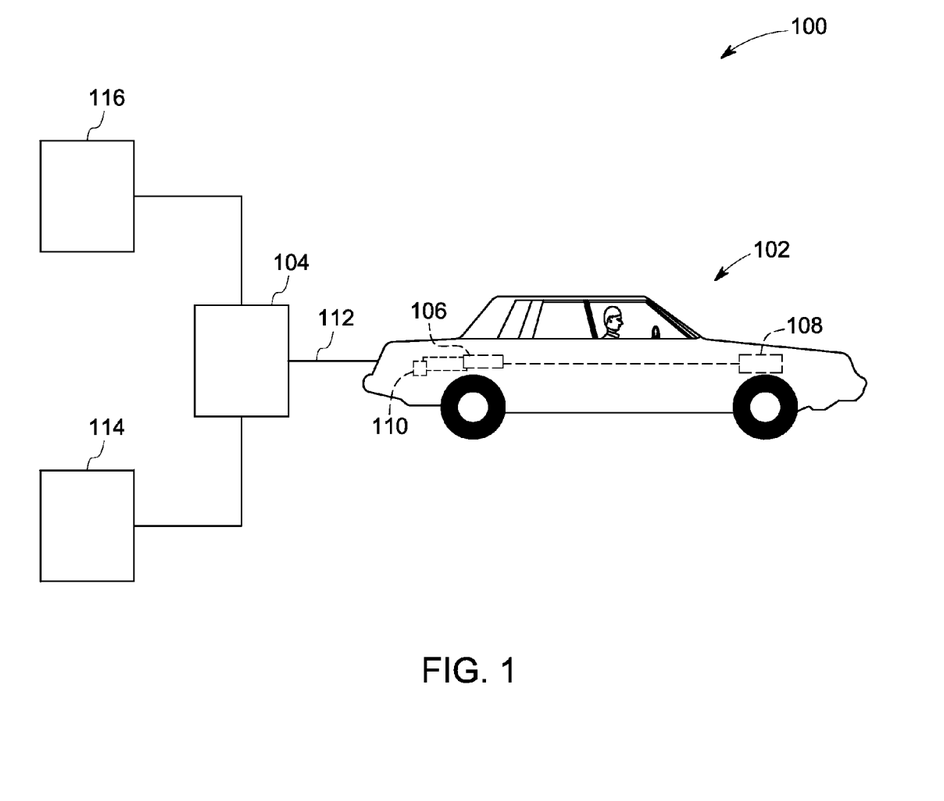
FIG. 1 is a block diagram of an exemplary system for charging an electric vehicle.

FIG. 1 illustrates an exemplary system 100 for use in charging, or providing electricity to, an electric vehicle 102. In an exemplary embodiment, system 100 includes a charging device 104 coupled to electric vehicle 102. Electric vehicle 102 includes at least one power storage device 106, such as a battery and/or any other storage device, coupled to a motor 108. Moreover, electric vehicle 102 includes a vehicle controller 110 coupled to power storage device 106.

In an exemplary embodiment, charging device 104 is removably coupled to power storage device 106 and to vehicle controller 110 by at least one power conduit 112. Alternatively, charging device 104 may be coupled to power storage device 106 and/or vehicle controller 110 by any other conduit or conduits, and/or charging device 104 may be coupled to vehicle controller 110 by a wireless data link (not shown). In the exemplary embodiment, power conduit 112 includes at least one conductor (not shown in FIG. 1) for supplying electricity to power storage device 106 and/or for transmitting data to, and receiving data from, vehicle controller 110. Moreover, in the exemplary embodiment, charging device 104 is coupled to an electric power source 114, such as a power grid of an electric utility company, a generator, a battery, and/or any other device or system that provides electricity to charging device 104.

Charging device 104 is coupled to at least one server 116 through a network, such as the Internet, a local area network (LAN), a wide area network (WAN), and/or any other network or data connection that enables charging device 104 to function as described herein. Server 116, in the exemplary embodiment, communicates with charging device 104, for example, by transmitting a signal to charging device 104 to authorize payment and/or delivery of electricity to power storage device 106, to access customer information, and/or to perform any other function that enables system 100 to function as described herein.

In some embodiments, charging device 104 may be located proximal to the electric vehicle 102, for example in a location between electric vehicle 102 and an adjacent electric vehicle in a standard parking lot. For example, charging device 104 may be located at a position along the length of a line separating electric vehicle 102 and an adjacent electric vehicle in a parking lot. In some embodiments, charging device 104 may be embedded in the ground, such that only a top portion of charging device 104 is visible, exposing a user interface 210, discussed in more detail with reference to FIG. 2. In some embodiments, charging device 104 may elevate out of the ground upon a first event, such as payment information or another identifier being provided thereto, by transmission through a radio frequency (RF) signal, infrared signal, or otherwise, as discussed herein. In such embodiments, charging device 104 may thereafter descend back into the ground upon a second event, such as the identifier being provided again or when charging of electric vehicle 102 is completed or has otherwise ended. In such embodiments, charging device 104 may be cylindrical and occupy a cylindrical bore in the ground. In other embodiments, charging device 104 may be of a different shape. In embodiments in which charging device 104 is located proximal to electric vehicle 102, power conduit 112 may be shorter in length than in embodiments in which charging device 104 is located farther away from electric vehicle 102. A shorter-length power conduit 112 may be less expensive to manufacture, less valuable to would-be thieves, and easier for a user to manipulate.

Server 116 and vehicle controller 110 each include at least one processor and at least one memory device. The processors each include any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." The memory devices each include a computer readable storage medium, such as, without limitation, random access memory (RAM), flash memory, a hard disk drive, a solid state drive, a diskette, a flash drive, a compact disc, a digital video disc, and/or any suitable memory device that enables the processors to store, retrieve, and/or execute instructions and/or data.

During operation, a user couples power storage device 106 to charging device 104 with power conduit 112. The user may access a user interface (not shown in FIG. 1) of charging device 104 to enter information, such as payment information, and/or to initiate power delivery to power storage device 106. Charging device 104 is configured to communicate with server 116, for example, to authenticate the user, to process the payment information, and/or to approve or authorize the power delivery. If charging device 104 receives a signal from server 116 that indicates approval or authorization to deliver power to power storage device 106, charging device 104 receives power from electric power source 114 and provides the power to power storage device 106 through power conduit 112.

Charging device 104 communicates with vehicle controller 110 wirelessly, through power conduit 112, and/or through any other conduit, to control and/or to monitor the delivery of power to power storage device 106. For example, vehicle controller 110 may transmit signals to charging device 104 indicating a charge level of power storage device 106 and/or a desired amount and/or rate of power to be provided by charging device 104. Moreover, charging device 104 may transmit signals to vehicle controller 110 indicating an amount and/or rate of electricity being delivered to power storage device 106. Additionally or alternatively, charging device 104 and/or vehicle controller 110 may transmit and/or receive any other signals or messages that enable system 100 to function as described herein. When power storage device 106 has been charged to a desired level, charging device 104 ceases delivering power to power storage device 106 and the user disengages power conduit 112 from power storage device 106 and/or from charging device 104.

Figure 2:
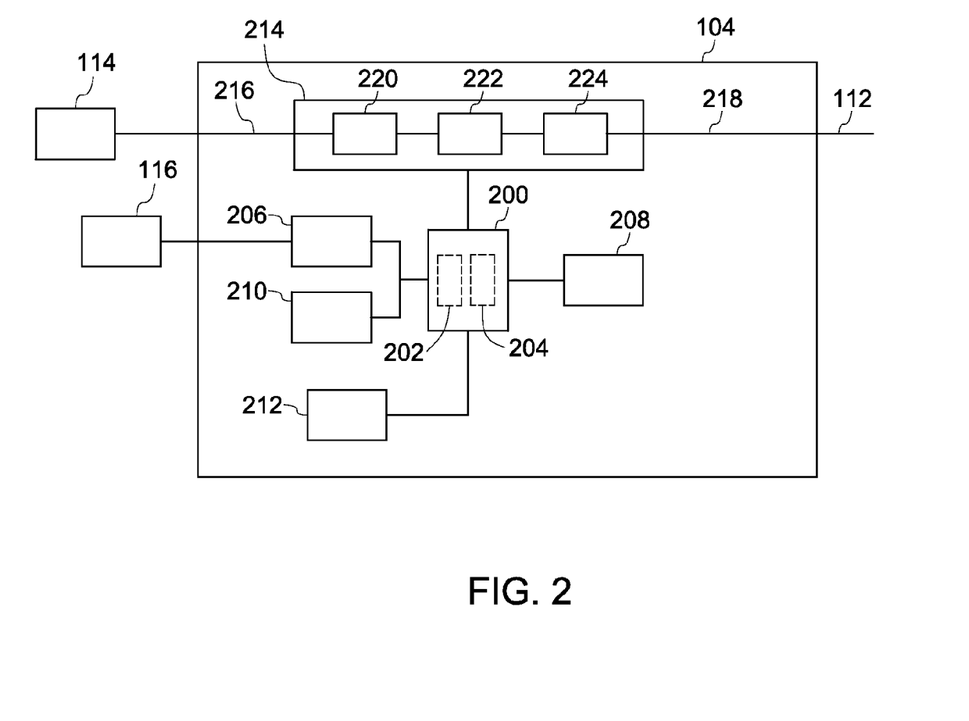
FIG. 2 is a block diagram of an exemplary charging device that may be used with the system shown in FIG. 1.

FIG. 2 is a block diagram of an exemplary charging device 104 that may be used with system 100 (shown in FIG. 1). In an exemplary embodiment, charging device 104 includes a controller 200 that includes a processor 202 and a memory device 204. As described more fully herein, controller 200 is coupled to a network interface 206, to a display 208, to a user interface 210, to a communication device 212, and to a current control module 214. Some embodiments may not include display 208, but rather transmit information for display on a mobile computing device, for example a cellular phone of a person using charging device 104.

Processor 202 includes any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor."

Memory device 204 includes a computer readable storage medium, such as, random access memory (RAM), flash memory, a hard disk drive, a solid state drive, a diskette, a flash drive, a compact disc, a digital video disc, and/or any suitable device that enables processor 202 to store, retrieve, and/or execute instructions and/or data. In some embodiments, all or part of memory device 204 is located not within charging device 104, but rather is located in a remote device or system (e.g., server 116) which is accessible to charging device 104 through network interface 206 described below.

Network interface 206, in an exemplary embodiment, transmits and receives data between controller 200 and a remote device or system, such as server 116 (shown in FIG. 1). Network interface 206 communicates with server 116 and controller 200 using any suitable communication protocol, such as a wired and/or a wireless Ethernet protocol.

Display 208 may include a vacuum fluorescent display (VFD) and/or one or more light-emitting diodes (LED). Additionally or alternatively, display 208 may include, without limitation, a liquid crystal display (LCD), a cathode ray tube (CRT), a plasma display, and/or any suitable visual output device capable of displaying graphical data and/or text to a user. In the exemplary embodiment, a charging status of power storage device 106 (shown in FIG. 1), payment information, user authentication information, power consumption information of charging device 104 and/or of electric vehicle 102, fault information of charging device 104 and/or of vehicle 102, and/or any other information may be displayed to a user on display 208. As discussed above, in some embodiments, information that would otherwise be presented through display 208 is transmitted to a mobile computing device, for example a cellular phone of a person using charging device 104.

User interface 210 includes a keyboard, a keypad, a touch-sensitive screen, a push button, a scroll wheel, a pointing device, a barcode reader, a magnetic card reader, a radio frequency identification (RFID) card reader, an audio input device employing speech-recognition software, a near field communication device reader, and/or any suitable device that enables a user to input data into charging device 104 and/or to retrieve data from charging device 104. In an exemplary embodiment, the user may input an identifier into charging device 104 using user interface 210. Moreover, the user may operate user interface 210 to initiate and/or terminate the delivery of power to power storage device 106. The identifier is used to authenticate the user or electric vehicle 102, to identify a payment account associated with the user or electric vehicle 102, to identify the user or electric vehicle 102, and/or to perform any other action associated with the charging operation. Accordingly, in an exemplary embodiment, the identifier includes a user identifier, an electric vehicle identifier, a credit card number, a payment account identifier, an authorization code, and/or any other suitable identifier that enables charging device 104 to operate as described herein. User interface 210 transmits the identifier to processor 202 using one or more signals. In some embodiments, all or part of user interface 210 is coupled to, or is located on or in, a remote device or system such as server 116, which is accessible to charging device 104 through network interface 206.

Communication device 212 includes, without limitation, a wireless receiver or transceiver, an RFID device, a near field communication device reader, an infrared detector, and/or any other suitable device that enables charging device 104 to receive a signal from the user device. In one embodiment, communication device 212 is integrated within user interface 210 or network interface 206. In an exemplary embodiment, communication device 212 receives a signal from a device employed by a user (hereinafter referred to as a "user device"), such as a wireless or remote control key fob, a cellular phone, or a payment card, for example. The signal is representative of, or includes, an identifier as described above with reference to user interface 210 associated with the user and/or electric vehicle 102. Communication device 212 transmits the identifier to processor 202 using one or more signals.

Current control module 214 is coupled to electric power source 114 at an input end 216 of charging device 104 and to power conduit 112 at an output end 218 of charging device 104. More specifically, in an exemplary embodiment, input end 216 is coupled to a single phase of a three phase alternating current (AC) power source, such as electric power source 114. Alternatively, input end 216 may be coupled to a direct current (DC) power source or to two or three phases of an AC power source.

Current control module 214 includes at least one current protection device 220, at least one current control device 222, and at least one current sensor 224. In one embodiment, if power conduit 112 includes a plurality of conductors for receiving a plurality of phases of AC power from electric power source 114, each conductor of power conduit 112 may be coupled to a separate current protection device 220, current control device 222, and/or current sensor 224.

Current protection device 220, in an exemplary embodiment, is activated to electrically isolate input end 216 from output end 218 if the current flowing through charging device 104 to power conduit 112 exceeds a predetermined threshold or current limit. More specifically, current protection device 220 activates, or "trips," when the current flowing through charging device 104 exceeds a rated current limit of current protection device 220. When current protection device 220 activates or trips, current is prevented from flowing through charging device 104 to power conduit 112 such that input end 216 is electrically isolated from output end 218. In an exemplary embodiment, current protection device 220 is a circuit breaker. Alternatively, current protection device 220 may be a fuse, a relay, and/or any other device that enables current protection device 220 to function as described herein.

Current control device 222, in an exemplary embodiment, is a contactor 222 coupled to current protection device 220. Moreover, contactor 222 is coupled to, and is controlled by, controller 200. In an exemplary embodiment, controller 200 operates contactor 222 (e.g., opens contactor 222) to interrupt the current flowing through charging device 104 to power conduit 112 if a fault is detected and/or if a charging operation is not in progress. As such, by operating or activating contactor 222, controller 200 prevents current from flowing to power storage device 106. In addition, controller 200 operates contactor 222 (e.g., closes contactor 222) to enable current to flow to power storage device 106, for example, if the charging operation is being performed.

At least one current sensor 224 measures and/or detects the current transmitted through charging device 104 during operation of charging device 104. In an exemplary embodiment, current sensor 224 is a current transformer that measures an amount of current transmitted through charging device 104 to electric vehicle 102. Current sensor 224 transmits one or more signals representative of the measured and/or detected current to controller 200.

During operation, power conduit 112 is coupled to electric vehicle 102. A user enters an identifier, such as a user identifier and/or a payment identifier, into user interface 210, and user interface 210 transmits the identifier (or a signal representative of the identifier) to processor 202. Alternatively, the user manipulates the user device such that communication device 212 receives the identifier (or a signal representative of the identifier) from the user device. Processor 202 receives the identifier from user interface 210 and/or from communication device 212. In an exemplary embodiment, processor 202 associates the identifier with the charging operation for use in locking and/or unlocking power conduit 112 to electric vehicle 102, as described more fully herein.

Figure 3:
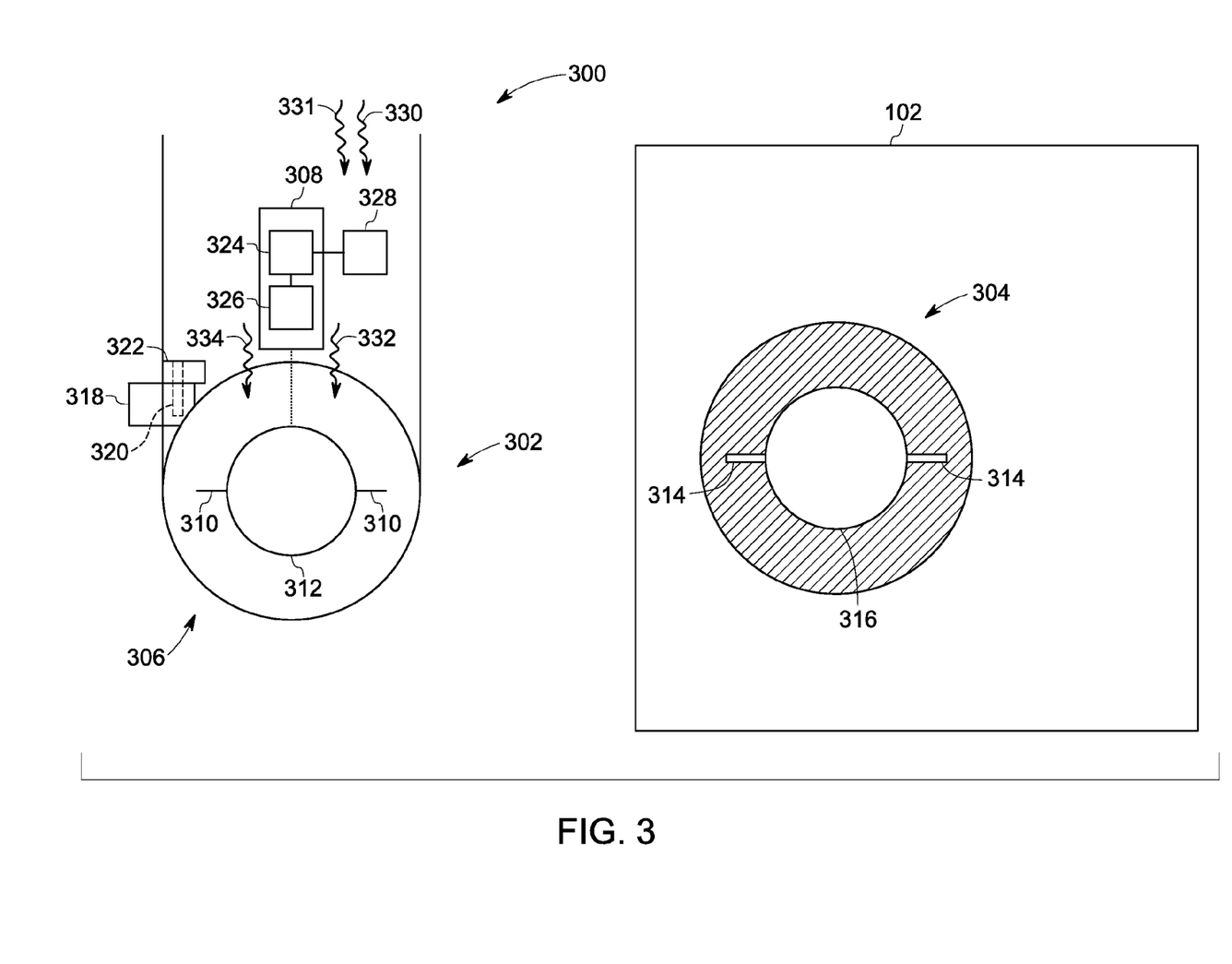
FIG. 3 is a block diagram of an exemplary power conduit that may be used with the charging device shown in FIG. 1.

FIG. 3 is a block diagram of an exemplary power conduit 300 that may be used with charging device 104 (shown in FIG. 1) and electric vehicle 102. For example, power conduit 300 may be used in place of power conduit 112 (shown in FIG. 1). In an exemplary embodiment, power conduit 300 includes an output terminal 302 that is configured to be at least partially inserted into, and/or configured to couple to, a charging port 304 of electric vehicle 102. When output terminal 302 is coupled to charging port 304, power conduit 300 electrically couples to power storage device 106 (shown in FIG. 1).

Power conduit output terminal 302 includes a locking mechanism 306 and a controller 308 is operably coupled to locking mechanism 306 and positioned proximate output terminal 302. In an exemplary embodiment, locking mechanism 306 includes one or more flanges 310 coupled to, or positioned proximate, an inner ring 312 of power conduit 300. In one embodiment, flanges 310 are shaped and sized to be received within corresponding flange receptacles 314 of charging port 304 when inner ring 312 is inserted within a ring receptacle 316 of charging port 304. As described more fully herein, flanges 310 are rotated to lock power conduit output terminal 302 within charging port 304. In another embodiment, flanges 310 are extendable and retractable with respect to inner ring 312. In such an embodiment, flanges 310 are retracted to enable inner ring 312 to be inserted within ring receptacle 316, and flanges 310 are extended to lock inner ring 312 to ring receptacle 316. Alternatively, locking mechanism 306 may include any other suitable mechanism to lock output terminal 302 to charging port 304, and/or flanges 310 may be coupled to any other component of power conduit 300.

As used herein, the term "lock" refers to a mechanical interaction between two components such that a first component is maintained in position with respect to the second component. It should be recognized that when the first component is locked to the second component, the first component is prevented from disengaging from the second component until the components are unlocked. As used herein, the term "unlock" refers to releasing the components from the mechanical interaction such that the first component may be disengaged from the second component.

In an exemplary embodiment, output terminal 302 also includes an actuator, such as a locking button 318, that operates to activate locking mechanism 306, thus causing locking mechanism 306 to lock power conduit output terminal 302 to charging port 304. Alternatively, the actuator may include a switch, a knob, or any other suitable actuator that enables power conduit 300 to operate as described herein. In one embodiment, locking button 318 is locked in an engaged position by a retention member 320 coupled to a support frame 322. In such an embodiment, locking button 318 is unlocked when an unlocking signal 330 is transmitted to power conduit controller 308 or when locking mechanism 306 is otherwise unlocked (i.e., disengaged).

Controller 308, in an exemplary embodiment, includes a processor 324 and a memory device 326. Processor 324 includes any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor."

Memory device 326 includes a computer readable storage medium, such as flash memory. Alternatively, memory device 326 may include RAM and/or any suitable device that enables processor 324 to store, retrieve, and/or execute instructions and/or data.

In an exemplary embodiment, a communication device 328 is coupled to controller 308. Communication device 328 communicates with communication device 212 of charging device 104. Communication device 328 includes, without limitation, a wireless receiver or transceiver, an RFID device, a near field communication device reader, an infrared detector, and/or any other suitable device that enables power conduit 300 to communicate with charging device 104. In one embodiment, communication device 328 receives a signal from a user device employed by a user, such as a wireless or remote control key fob, a cellular phone, or a payment card, for example. The signal is representative of, or includes, an identifier as described above with reference to FIG. 2 that is associated with the user and/or electric vehicle 102. Communication device 328 transmits the identifier to processor 324 and/or to processor 202 using one or more signals.

During operation, a user couples power conduit 300 to electric vehicle 102 by inserting output terminal 302 into charging port 304. In one embodiment, the user presses locking button 318 to engage locking mechanism 306, thus locking power conduit output terminal 302 to charging port 304. In another embodiment, the user enters an identifier into charging device 104 to prepay for a charging operation, for example, and controller 200 of charging device 104 transmits a signal that causes locking mechanism 306 to lock power conduit output terminal 302 to charging port 304. More specifically, controller 200 of charging device 104 uses communication device 212 to transmit a locking signal 331 to communication device 328 of power conduit 300, and communication device 328 transmits the locking signal 331 to processor 324 of power conduit controller 308. In one embodiment, communication device 328 receives the identifier from processor 202 (and communication device 212) of charging device 104, and communication device 328 transmits the identifier to processor 324. Processor 324 receives the locking signal 331 (or the identifier) and causes locking mechanism 306 to lock output terminal 302 to charging port 304. For example, processor 324 may generate a locking signal 334, using communication device 328 or another suitable component of power conduit 300, to emit an electromagnetic field that causes locking mechanism 306 (e.g., flanges 310) to engage charging port 304 to lock output terminal 302 to charging port 304. Alternatively, processor 324 may transmit a locking signal 334 to an actuator (not shown) that rotates, extends, or otherwise causes flanges 310 to engage charging port 304.

In an exemplary embodiment, once power conduit output terminal 302 is locked within charging port 304, power conduit output terminal 302 remains locked until the same identifier that was used to initiate the charging operation is received to terminate the charging operation, or after the charging operation has been terminated. In an embodiment in which the user locked power conduit 300 (i.e., output terminal 302) using locking button 318, power conduit output terminal 302 remains locked until the identifier described above is received after the charging operation has been initiated or terminated. In other embodiments, power conduit output terminal 302 unlocks when power storage device 106 reaches a predetermined charged state, such as a complete charge state. For example, vehicle controller 110 may transmit a signal to charging device 104 and/or power conduit 300 that power storage device 106 is completely charged, whereupon power conduit output terminal 302 unlocks. In other embodiments, power conduit output terminal 302 unlocks when power storage device 106 reaches a predetermined charge state other than a complete charge state.

When the charging operation terminates, or when the user desires to terminate the charging operation, the user enters the identifier into charging device 104 (or into communication device 328 of power conduit 300 as described below). When the identifier is entered after power conduit 300 has been locked into charging port 304, charging device controller 200 transmits an unlocking signal 330 (or the identifier) to power conduit controller 308 through communication device 212 of charging device 104 and through communication device 328 of power conduit 300. In response to receiving the unlocking signal 330 or the identifier, or alternatively, if the identifier is input into power conduit controller 308 by the user, power conduit controller 308 causes locking mechanism 306 to be disengaged from charging port 304, thus unlocking power conduit 300 (i.e., output terminal 302) from charging port 304. For example, processor 324 may generate an unlocking signal 332, using communication device 328 or another suitable component of power conduit 300, to emit an electromagnetic field that causes locking mechanism 306 (e.g., flanges 310) to disengage from charging port 304 to unlock power conduit output terminal 302 from charging port 304. Alternatively, processor 324 may transmit an unlocking signal 332 to an actuator (not shown) that rotates, retracts, or otherwise causes flanges 310 to disengage from charging port 304.

When power conduit output terminal 302 is unlocked from charging port 304, the user disengages power conduit 300 from charging port 304. Power conduit 300 may be stored within charging device 104, within electric vehicle 102 (after being disengaged from charging device 104), or within any suitable location.

Figure 4:
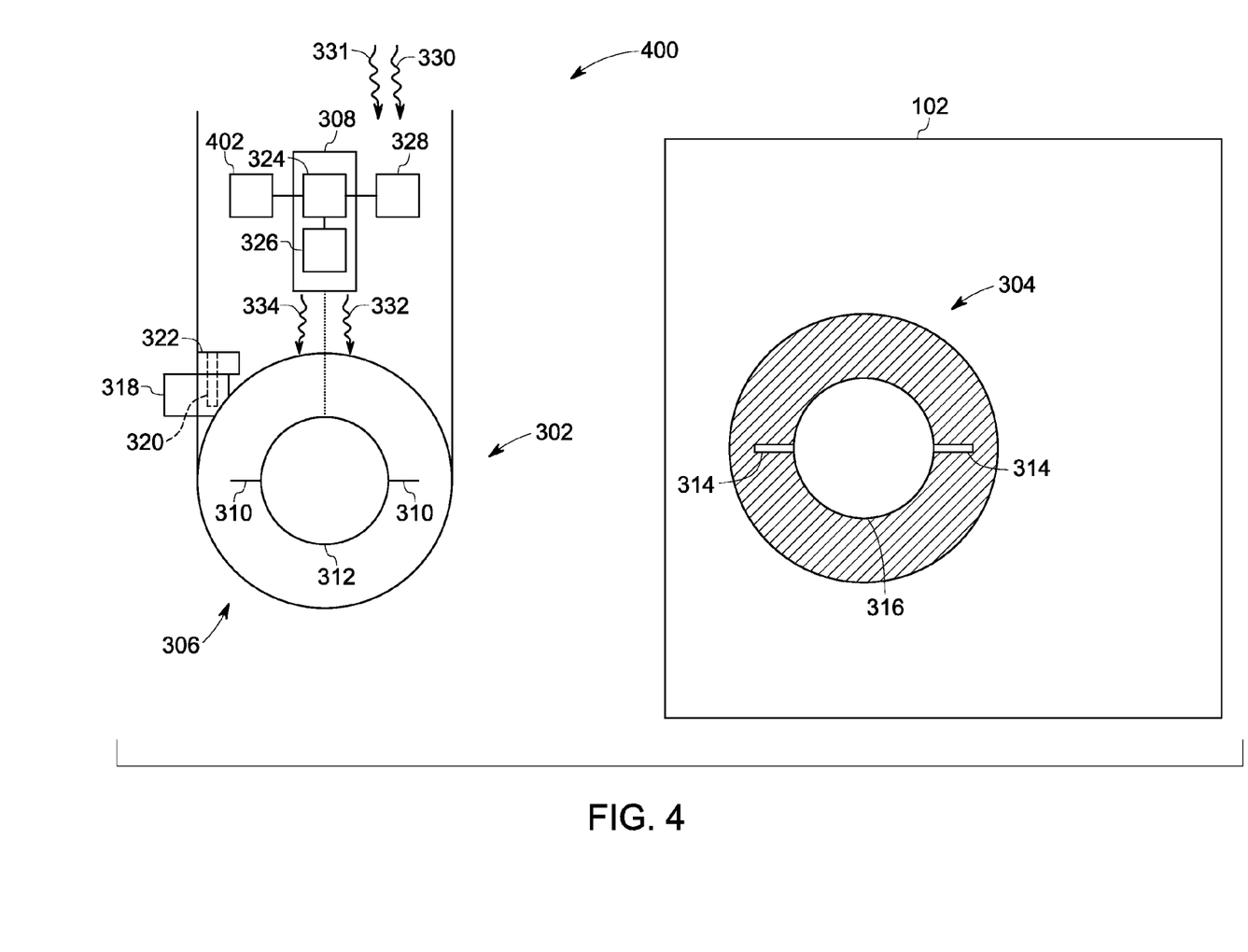
FIG. 4 is a block diagram of another exemplary power conduit that may be used with the charging device shown in FIG. 1.

FIG. 4 is a block diagram of an exemplary power conduit 400 that may be used with charging device 104 (shown in FIG. 1) and electric vehicle 102. For example, power conduit 400 may be used in place of power conduit 112 (shown in FIG. 1). Unless otherwise specified, power conduit 400 is similar to power conduit 300 (shown in FIG. 3), and similar components are labeled in FIG. 4 with the same reference numerals used in FIG. 3.

In an exemplary embodiment, power conduit controller 308 includes processor 324 and memory device 326, and communication device 328 is coupled to controller 308. Power conduit 400 also includes a user interface 402 coupled to controller 308. Alternatively, user interface 402 may be incorporated within communication device 328 or any other component of power conduit 400.

User interface 402 includes, without limitation, a keyboard, a keypad, a touch-sensitive screen, a push button, a scroll wheel, a pointing device, a barcode reader, a magnetic card reader, a radio frequency identification (RFID) card reader, an audio input device employing speech-recognition software, a near field communication device reader, and/or any suitable device that enables a user to input information, such as identification information and/or payment information, into power conduit controller 308. In an exemplary embodiment, the user may input an identifier into power conduit controller 308 using user interface 402 in a similar manner as described above with reference to FIG. 2. Moreover, the user may operate user interface 402 to initiate and/or terminate the delivery of power to power storage device 106. The identifier is used to authenticate the user or electric vehicle 102, to identify a payment account associated with the user or electric vehicle 102, to identify the user or electric vehicle 102, and/or to perform any other action associated with the charging operation. Accordingly, in an exemplary embodiment, the identifier includes a user identifier, an electric vehicle identifier, a credit card number, a payment account identifier, an authorization code, and/or any other suitable identifier that enables power conduit 400 to operate as described herein. User interface 402 transmits the identifier to processor 324 and/or to processor 202 using one or more signals.

The identifier is transmitted to charging device 104 using communication device 328 of power conduit 400, and the charging operation is authorized as described above. In other respects, power conduit 400 operates in a similar manner as power conduit 300 (described above with reference to FIG. 3). Accordingly, as described herein, the user inputs the identifier to lock and unlock power conduit 400 (i.e., output terminal 302) with respect to charging port 304 and/or to initiate and/or terminate the charging operation. As such, the user may be required to spend less time at charging device 104 (i.e., away from electric vehicle 102) thereby potentially increasing convenience and/or safety of the charging operation.

Figure 5:
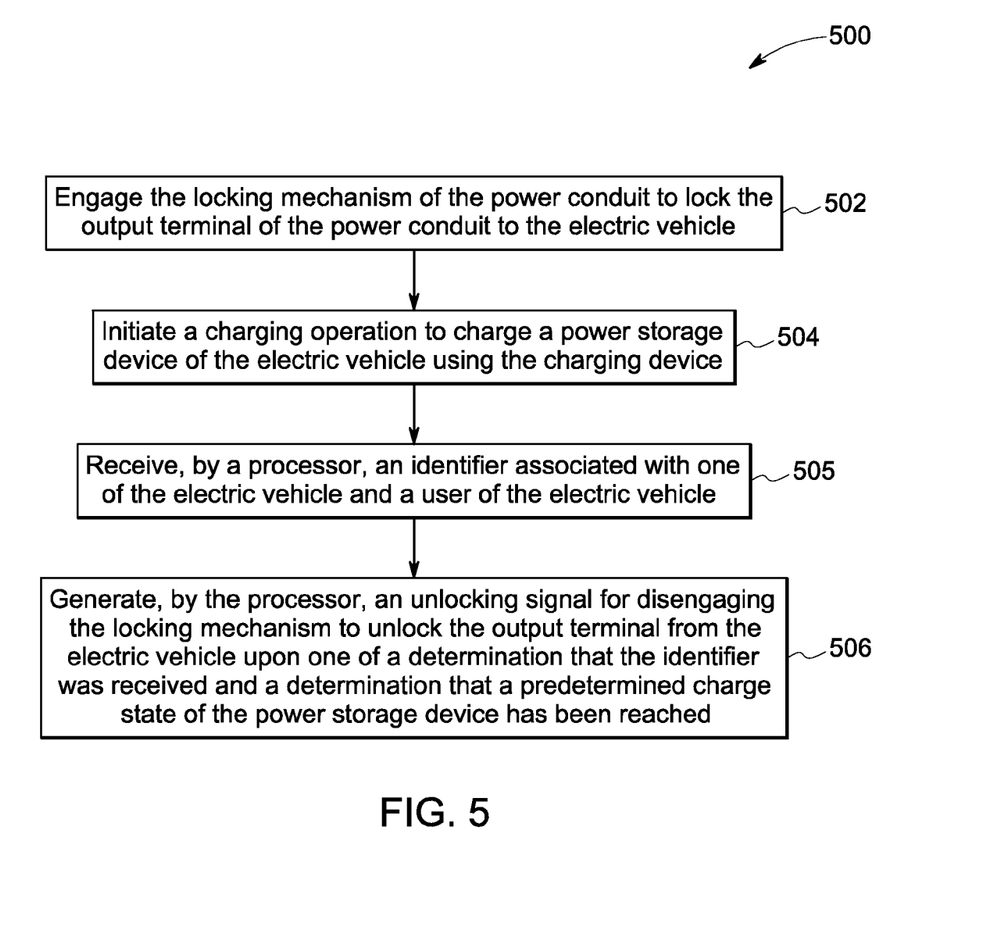
FIG. 5 is a flow diagram of an exemplary method of charging a power storage device that may be used with the charging device shown in FIG. 1.

FIG. 5 is a flow diagram of an exemplary method 500 of charging a power storage device, such as power storage device 106 (shown in FIG. 1). In an exemplary embodiment, method 500 is executed by controller 200 (shown in FIG. 2) of charging device 104 (shown in FIG. 1), and/or by controller 308 of power conduit 300 (both shown in FIG. 3) and/or by controller 308 of power conduit 400 (shown in FIG. 4).

In an exemplary embodiment, method 500 includes engaging 502 locking mechanism 306 of power conduit 400 to lock output terminal 302 of power conduit 400 to charging port 304 of electric vehicle 102. For example, a locking signal 331 is transmitted from processor 202 of charging device 104 to processor 324 of power conduit 400. The locking signal 331 causes processor 324 of power conduit 400 to engage locking mechanism 306 to lock power conduit 400 to charging port 304. Alternatively, the user may depress or otherwise activate locking button 318 to engage 506 locking mechanism 306, thus locking power conduit 400 to charging port 304.

After power conduit 400 has been locked to charging port 304, the charging operation is initiated 504 to charge (i.e., to supply electrical power to) power storage device 106 of electric vehicle 102 using charging device 104. When power storage device 106 reaches a desired charge level, or when any other suitable terminating condition is satisfied, the charging operation of power storage device 106 is terminated by processor 202, for example. However, in an exemplary embodiment, power conduit 400 remains locked to charging port 304 until the user enters the identifier (for the second time) into charging device 104 or into power conduit 400. The identifier is received 506 (e.g., for the second time), by processor 202 of charging device 104 and/or by processor 324 of power conduit 400. After the charging operation has been terminated and upon a determination (by processor 202 and/or by processor 324) that the identifier was received, processor 324 disengages 508 locking mechanism 306 to unlock power conduit 400 from charging port 304 and from electric vehicle 102.

In some embodiments, method 500 includes the preliminary step of coupling the power conduit, such as power conduit 400, to a charging port 304 (shown in FIG. 3) of electric vehicle 102 (shown in FIG. 1), such as by inserting output terminal 302 (shown in FIG. 3) into charging port 304. As another preliminary step, an identifier, such as a payment identifier or a user identifier, is received for a charging operation of electric vehicle 102 (shown in FIG. 1). For example, a user may enter credit card information or another payment identifier into charging device 104 through user interface 210 or through communication device 212, or into power conduit 400 through user interface 402 or through communication device 328, and the payment identifier is transmitted to processor 202 of charging device 104 and/or to processor 324 of power conduit 400. In alternative embodiments, an identifier, for example a payment identifier or a user identifier, as discussed above, is received before coupling a power conduit, such as power conduit 400, to a charging port 304. That is, in such embodiments, an identifier must be received from a user in order for the user to obtain access to the power conduit. This alternative order of steps is useful for embodiments in which the power conduit extends and retracts from charging device 104 and/or charging device 104 extends from and descends into the ground.

In one embodiment, the user locks power conduit 400 to charging port 304 by engaging locking button 318, and the user unlocks power conduit 400 from charging port 304 by entering the identifier into charging device 104 or power conduit 400 after the charging operation has been terminated. In another embodiment, power conduit 400 is locked to charging port 304 after the user enters the identifier into charging device 104 or power conduit 400 a first time, and power conduit 400 is unlocked after the user enters the identifier into charging device 104 or power conduit 400 a second time, e.g., after the charging operation has been initiated or has terminated. Accordingly, the user may leave electric vehicle 102 unattended during at least a portion of the charging operation without worrying that power conduit 400 will be undesirably unplugged from charging port 304.

A technical effect of the power conduit, charging device, and method described herein includes at least one of (a) engaging a locking mechanism of a power conduit to lock an output terminal of the power conduit to a vehicle; (b) initiating a charging operation to charge a power storage device using a charging device; (c) receiving, by a processor, an identifier associated with one of a vehicle and a user of the vehicle; and (d) generating, by the processor, an unlocking signal for disengaging the locking mechanism to unlock the output terminal of the power conduit from the vehicle upon one of a determination that an identifier was received and a determination that a predetermined charge state of the power storage device has been reached.

Exemplary embodiments of a power conduit, a charging device, and a method of charging a power storage device are described above in detail. The power conduit, charging device, and method are not limited to the specific embodiments described herein, but rather, components of the power conduit and/or charging device and/or steps of the method may be utilized independently and separately from other components and/or steps described herein. For example, the charging device and/or power conduit may also be used in combination with other power systems and methods, and are not limited to practice with only the electric vehicle as described herein. Rather, an exemplary embodiment can be implemented and utilized in connection with many other power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power conduit for charging a power storage device of a vehicle, said power conduit comprising:
    an output terminal;
    a locking mechanism that is operatively disposable in one of an engaged position and a disengaged position, wherein said locking mechanism is configured to lock said output terminal to the vehicle when said locking mechanism is disposed in the engaged position and configured to unlock said output terminal from the vehicle when said locking mechanism is in the disengaged position; and
    a controller operatively coupled to said locking mechanism, said controller comprising:
        a memory device configured to store a plurality of computer-executable instructions; and
        a processor coupled to said memory device, wherein, when executed by said processor, the computer-executable instructions configure said processor to:
            receive an identifier associated with one of the vehicle and a user of the vehicle; and
            generate and transmit an unlocking signal to cause said locking mechanism to be in the disengaged position upon a determination that a predetermined charge state of the power storage device has been reached.

2. A power conduit in accordance with claim 1, further comprising a communication device configured to receive the identifier and to transmit the identifier to said processor.

3. A power conduit in accordance with claim 2, wherein said power conduit is configured to be coupled to a charging device positioned remotely from the vehicle, said communication device is configured to receive the identifier from the charging device.

4. A power conduit in accordance with claim 1, further comprising a user interface configured to receive the identifier and to transmit the identifier to said processor.

5. A power conduit in accordance with claim 1, further comprising an actuator configured to cause said locking mechanism to be in the engaged position.

6. A power conduit in accordance with claim 1, wherein said processor is configured to:
    receive the identifier a first time;
    generate and transmit a locking signal to cause said locking mechanism to be in the engaged position upon a determination that the identifier was received the first time;
    receive the identifier a second time; and
    generate and transmit the unlocking signal to cause said locking mechanism to be in the disengaged position upon a determination that the identifier was received the second time.

7. A power conduit in accordance with claim 1, wherein said output terminal is configured to be electrically coupled to the power storage device and said controller is positioned proximate said output terminal.

8. A charging device for use in charging a power storage device of a vehicle through a power conduit that includes an output terminal and a locking mechanism operatively disposable in one of an engaged position and a disengaged position, wherein the locking mechanism is configured to lock the output terminal of the power conduit to the vehicle when the locking mechanism is in the engaged position and configured to unlock the output terminal from the vehicle when the locking mechanism is in the disengaged position, said charging device comprising:
    a memory device configured to store a plurality of computer-executable instructions; and
    a processor coupled to said memory device, wherein, when executed by said processor, the computer-executable instructions configure said processor to:
        receive an identifier associated with one of the vehicle and a user of the vehicle; and
        transmit an unlocking signal to the power conduit to cause the locking mechanism to be in the disengaged position upon a determination that a predetermined charge state of the power storage device has been reached.

9. A charging device in accordance with claim 8, further comprising a communication device configured to receive the identifier and to transmit the identifier to said processor.

10. A charging device in accordance with claim 8, further comprising a user interface configured to receive the identifier and to transmit the identifier to said processor.

11. A charging device in accordance with claim 8, wherein said processor is configured to:
    receive the identifier a first time;
    transmit a locking signal to the power conduit to cause the locking mechanism to be in the engaged position upon a determination that the identifier was received the first time;
    receive the identifier a second time; and
    transmit the unlocking signal to the power conduit to cause the locking mechanism to be in the disengaged position upon a determination that the identifier was received the second time.

12. A charging device in accordance with claim 11, wherein said processor is further configured to initiate a charging operation of the power storage device after the locking signal has been transmitted to the power conduit.

13. A charging device in accordance with claim 12, wherein said processor is further configured to:
    terminate the charging operation; and
    transmit the unlocking signal to the power conduit after the charging operation has been terminated and upon the determination that the identifier was received the second time.

14. A method of charging a power storage device of an electric vehicle using a charging device and a power conduit configured to be coupled to the charging device and the electric vehicle, wherein the power conduit includes an output terminal and a locking mechanism, said method comprising:
    engaging the locking mechanism of the power conduit to lock the output terminal of the power conduit to the electric vehicle;
    initiating a charging operation to charge the power storage device of the electric vehicle using the charging device;
    receiving, by a processor, an identifier associated with one of the electric vehicle and a user of the electric vehicle; and
    generating, by the processor, an unlocking signal for disengaging the locking mechanism to unlock the output terminal from the electric vehicle upon a determination that a predetermined charge state of the power storage device has been reached.

15. A method in accordance with claim 14, wherein a communication device is included within at least one of the charging device and the power conduit, said method further comprising receiving the identifier by the communication device.

16. A method in accordance with claim 14, wherein a user interface is included within at least one of the charging device and the power conduit, said method further comprising receiving the identifier by the user interface.

17. A method in accordance with claim 14, wherein the power conduit includes an actuator, said method further comprises engaging the locking mechanism using the actuator.

18. A method in accordance with claim 14, further comprising:
    receiving the identifier a first time;
    engaging the locking mechanism upon a determination that the identifier was received the first time;
    receiving the identifier a second time; and
    disengaging the locking mechanism upon a determination that the identifier was received the second time.

19. A method in accordance with claim 18, wherein said initiating a charging operation comprises initiating a charging operation after the locking mechanism has been engaged.

20. A method in accordance with claim 18, wherein said method further comprises:
    terminating the charging operation; and
    disengaging the locking mechanism after the charging operation has been terminated and upon the determination that the identifier was received the second time.

* * * * *